(12) United States Patent
Schnitzer

(10) Patent No.: US 8,091,847 B2
(45) Date of Patent: Jan. 10, 2012

(54) CONNECTABLE PROFILED MOUNTING RAIL (BASE RAIL)

(75) Inventor: Sandy Schnitzer, Rangsdorf (DE)

(73) Assignee: Mounting Systems GmbH, Rangsdorf (DE)

( * ) Notice: Subject to any disclaimer, the term of this patent is extended or adjusted under 35 U.S.C. 154(b) by 93 days.

(21) Appl. No.: 12/596,464

(22) PCT Filed: Apr. 4, 2008

(86) PCT No.: PCT/DE2008/000593
§ 371 (c)(1),
(2), (4) Date: Jan. 12, 2010

(87) PCT Pub. No.: WO2008/128507
PCT Pub. Date: Oct. 30, 2008

(65) Prior Publication Data
US 2010/0132693 A1  Jun. 3, 2010

(30) Foreign Application Priority Data
Apr. 19, 2007  (DE) .................. 20 2007 006 021 U

(51) Int. Cl.
*A47F 5/00*  (2006.01)
(52) U.S. Cl. ................... 248/309.1; 248/205.1; 248/237
(58) Field of Classification Search ............... 248/309.1, 248/237, 205.1; 52/563.2, 655.1, 698, 173.3, 52/590.2, 836, 844; 126/623; 136/244; 165/48.2
See application file for complete search history.

(56) References Cited

U.S. PATENT DOCUMENTS

| 2004/0253051 | A1  | 12/2004 | Napp |
| 2010/0192505 | A1* | 8/2010  | Schaefer et al. ............. 52/653.2 |
| 2010/0206301 | A1* | 8/2010  | Aftanas ......................... 126/680 |
| 2011/0000519 | A1* | 1/2011  | West ............................. 136/244 |

FOREIGN PATENT DOCUMENTS

| DE | 202005000484 U1 | 5/2005 |
| EP |       0540982 A | 5/1993 |
| EP |       1624127 A | 2/2006 |
| FR |       2258502 A | 8/1975 |
| FR |       2885149 A | 11/2006 |
| WO |    2004018883 A | 3/2004 |

* cited by examiner

*Primary Examiner* — Ramon Ramirez
(74) *Attorney, Agent, or Firm* — Patent Central LLC; Stephen A. Pendorf

(57) ABSTRACT

The invention relates to a connectable profiled mounting rail, comprising longitudinal webs (3) for connecting the elements to be mounted, wherein the basic profile has a discontinuous, essentially rectangular surface line (4). On the one side, a connection profile (5) for attachment of the profiled mounting rail (1) is provided. The connection profiles (6, 7) located on the opposite side are arranged in such a structural manner that a second profiled mounting rail (2) which has the same profile cross-section and is rotated by 180° can be connected in a positive fit to the first profiled mounting rail (1) by inserting the connection profiles (6, 7) into each other.

9 Claims, 2 Drawing Sheets

CONNECTABLE PROFILED MOUNTING RAIL (BASE RAIL)

BACKGROUND OF THE INVENTION

1. Field of the Invention

The invention concerns a profiled mounting rail, in particular for fastening solar modules.

2. Description of the Related Art

From DE 20 2005 000 484 U1 a mounting system for the fastening of solar modules is known, that has at least two profiled mounting rails provided at a distance from one another with a support each for the module or the modules that limits the height of the profile, as well as a connection below the support for fastening to the roof. The profiled mounting rail has profiles laterally or laterally and below that can be joined with a connecting profile rail, while after the joining between the two profiles a form-locked joint is produced at least in two points and one force-locked joint can be produced, whereby the connecting profile rail after the form-locked joint established with the profile height of the profiled mounting rail terminates at the top, the mechanical loading capacity of the connecting profile rail is close to or equals that of the profiled mounting rail and the form-locking between the profiles of the profiled mounting rail and the connecting profile rail is carried out by moving them into one another.

With the basic construction described above it is possible to employ profiled mounting rails with standard lengths of, for example, 2.95 m or 6 m, and to replace the missing piece at the end with a connecting profile rail. Since the joint of both rails is flexible, an accurate dimensioning of the supporting framework is warranted. Sections of the profiled mounting rails can be placed on or pushed onto the connecting profile rails, so that as far as the fastening of the solar module or of the roof are concerned work can be continued in accordance with the system.

A disadvantage of this arrangement is that two different profiles are used for the profiled mounting rails and the connecting profile rails.

BRIEF SUMMARY OF THE INVENTION

The object of the invention is to achieve unification.

According to the invention a connectable profiled mounting rail that has longitudinal webs to join elements to be assembled is such a rail the basic profile of which has a discontinuous essentially rectangular envelope line, one side of which has a connecting profile for the joining of the profiled mounting rail to, for example, a part of the building and on the opposite situated side connecting profiles are so constructed that a second profiled mounting rail having a profile with the same cross-section and rotated by 180° can be joined with the first profiled mounting rail in a form-locked manner by sliding them into one another. At the same time the connecting profiles are constructed along the length of the profiled mounting rail, analogously with the longitudinal webs.

In this manner the first mounting rail with lateral offset can be extended or the first profiled mounting rail can be continued by inserting a third profiled mounting rail having the same cross-section into the second profiled mounting rail without lateral offset, therefore aligned.

When the second profiled mounting rail is used only as a connecting piece between the first and the third profiled mounting rails, it can be executed correspondingly short. It is also possible to insert into the second profiled mounting rail only short profiled pieces with the same cross-section, so that to retain fastening positions which are aligned with the first profiled mounting rail, on which the actual solar module will rest.

In contrast to the state-of-the-art, with the proposed solution only profiled rails with one cross-section are required to materialise profiled mounting rails of any length, for example for the mounting of solar collectors or to obtain aligned fastening and supporting positions projecting past a profiled mounting rail.

By virtue of simple transversal bolts a longitudinal displacement of the profiled mounting rails and/or profiled pieces already joined via the connecting profiles in a form-locking manner can be achieved.

According to an advantageous execution the profiled mounting rails inserted into one another in a form-locking manner form at the top a common smooth support surface.

Due to the manufacturing aspects of the extrusion process of the profiled mounting rails as well as the accuracy and strength required, the connecting profiles forming the lock-forming connection have an oblique-angled guide, preferably a double-sided dovetail guide. In this conjunction it has proved itself when the connecting profiles of the profiled mounting rails to be joined alternate along the envelope line between a profile accommodating the web and a web itself.

BRIEF DESCRIPTION OF THE SEVERAL VIEWS OF THE DRAWINGS

The profiled mounting rail is explained in an embodiment using an example of the mounting of a solar module.

They show in.

DETAILED DESCRIPTION OF THE INVENTION

Figure 1:
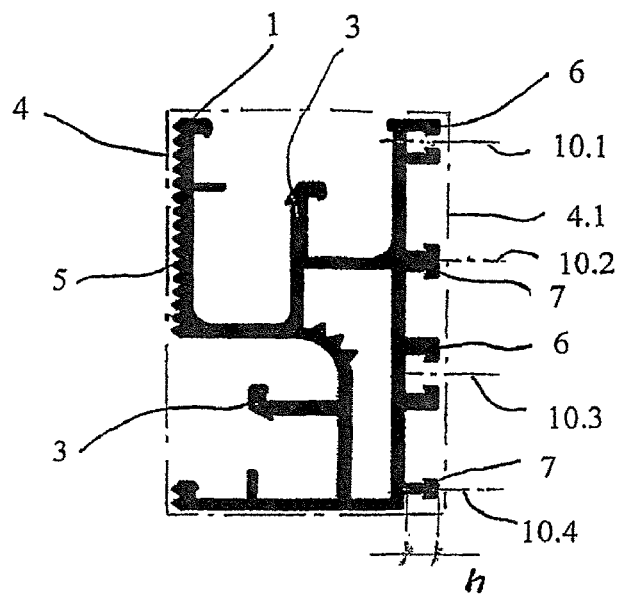
FIG. 1—a profiled mounting rail
FIG. 2—an assembled profiled mounting rail, and
FIG. 3—the guide, detailed.

The profiled mounting rail 1, illustrated in FIG. 1, has a web like composed profile with an essentially rectangular envelope line 4. For the sake of visibility this is indicated in the drawing somewhat outside of the profile. In the case of these profiled mounting rails 1, produced by extrusion, the longitudinal webs (some are designated by the reference numeral 3) extend over the entire length of the mounting profile. The webs 3 serve the purpose accommodating the fastening elements of the solar module. The profiled mounting rail 1 has on one side a connecting profile for a fastening element to produce a joint with parts of the roof or other parts of the building.

On the opposite situated side the connecting profiles 6, 7 are so designed, that a second profiled mounting rail 2, having the same profile section and rotated by 180°, can be joined with the first profiled mounting rail 1 in a form-locked manner by sliding the connecting profiles 6, 7 into one another.

These connecting profiles are characterised in that
the profiled mounting rails 1, 2, pushed into one another in a form-locked manner, form at the top a common smooth mounting surface 8,
all or some connecting profiles 6, 7, forming a form-locked joint, have an oblique-angled guide 9, preferably a double-sided one (dovetail guide),
relative each of the perpendiculars 10.1-n to the lateral envelope line 4.1 the guide 9 and the connecting profiles 6, 7 have mirror image halves, and
the distance between adjacent perpendiculars 10.1-10.2, 10.2-10.3 is the same.

Figure 2:
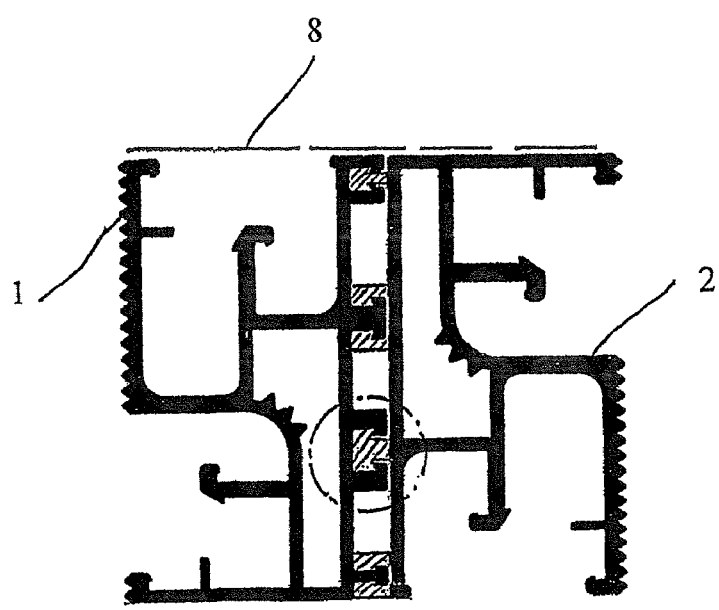
Figure 3:
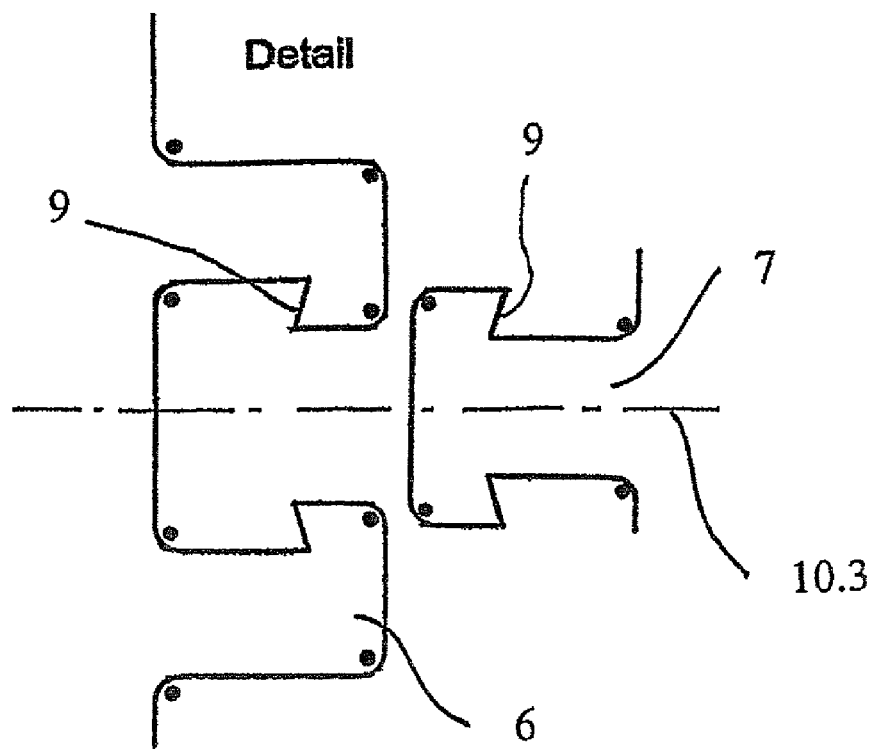

A joint of two profiled mounting rails 1, 2, produced by means of these connecting profiles 6, 7, is illustrated in FIG. 2. The hatched profiles are components of the profiled mounting rail 2. A detailed view of such a guide 9 produced by pushing them into one another is shown in FIG. 3.

Due to the fact that the connecting profiles 6, 7 have the same height (h) measured from the lateral envelope line 4.1, both profiled mounting rails 1, 2 abut well against one another and can be fixed against a longitudinal displacement by a transverse bolt.

LIST OF REFERENCE NUMERALS

1 Profiled mounting rail
2 Profiled mounting rail
3 Longitudinal web
4 Envelope line
4.1 Envelope line
5 Connecting profile
6 Connecting profile accommodating the web
7 Connecting profile—web
8 Support surface
9 Guide
10 Perpendicular

The invention claimed is:

1. A connectable profiled mounting rail, that has longitudinal webs (3) for connecting elements to be mounted,
wherein the basic periphery of the cross-section of the mounting rail has a discontinuous essentially rectangular envelope line (4),
wherein on one side a connecting profile (5) for fastening the profiled mounting rail (1) to a substrate is provided,
wherein on the opposite situated side form fitting connecting profiles (6, 7) are so constructed that a second profiled mounting rail (2) having a profile with the same cross-section and rotated by 180° can be joined with the first profiled mounting rail (1) in a form-locked manner by sliding the connecting profiles (6, 7) of the first mounting rail (1) into the form fitting connecting profiles (6, 7) of the second mounting rail (2), and
wherein the form fitting profiles (6, 7) have the same height (h) above the lateral surface line (4.1), and the form fitting profiles (6, 7) alternate between a web-engaging profile (6) and a web (7).

2. The connectable profiled mounting rail according to claim 1, wherein the connecting profiles (6, 7) extend over the length of the profiled mounting rail.

3. The connectable profiled mounting rail according to claim 1, wherein all or some connecting profiles (6, 7) forming a form-locked joint have an oblique-angled guide (9).

4. The connectable profiled mounting rail according to claim 1, wherein relative each of the perpendiculars (10.1-n) to the lateral envelope line (4.1) the guide (9) and the connecting profiles (6, 7) have mirror image halves.

5. The connectable profiled mounting rail according to claim 4, wherein the distance between adjacent perpendiculars (10.1-10.2, 10.2-10.3) is the same.

6. The connectable profiled mounting rail according to claim 1, wherein all or some connecting profiles (6, 7) forming a form-locked joint have a double-sided oblique-angled guide (9) (dovetail guide).

7. A connectable profiled mounting rail, that has longitudinal webs (3) for connecting elements to be mounted,
wherein the basic cross-sectional profile has a discontinuous essentially rectangular envelope line (4),
wherein on one side a connecting profile (5) for fastening the profiled mounting rail (1) to a substrate is provided,
wherein on the opposite situated side form fitting connecting profiles (6, 7) are so constructed that a second profiled mounting rail (2) having a profile with the same cross-section and rotated by 180° can be joined with the first profiled mounting rail (1) in a form-locked manner by sliding the connecting profiles (6, 7) of the first mounting rail (1) into the form fitting connecting profiles (6, 7) of the second mounting rail (2), and
wherein the profiled mounting rails (1, 2) pushed into one another in a form-locked manner form at the top a common smooth mounting surface (8).

8. The connectable profiled mounting rail according to claim 7, wherein the connecting profiles (6, 7) alternate between a profile (6) accommodating the web and a web (7) itself.

9. A connectable profiled mounting rail, that has longitudinal webs (3) for connecting elements to be mounted,
wherein the basic periphery of the cross-section of the mounting rail has a discontinuous essentially rectangular envelope line (4),
wherein on one side a connecting profile (5) for fastening the profiled mounting rail (1) to a substrate is provided,
wherein on the opposite situated side form fitting connecting profiles (6, 7) are so constructed that a second profiled mounting rail (2) having a profile with the same cross-section and rotated by 180° can be joined with the first profiled mounting rail (1) in a form-locked manner by sliding the connecting profiles (6, 7) of the first mounting rail (1) into the form fitting connecting profiles (6, 7) of the second mounting rail (2), and
wherein the form fitting profiles (6, 7) have the same height (h) above the lateral surface line (4.1), the form fitting profiles (6, 7) alternate between a web-engaging profile (6) and a web (7), and at least two profiles (6) accommodating the web and at least two webs (7) are provided on each mounting rail.

* * * * *